US006555189B2

(12) United States Patent
Gueret

(10) Patent No.: US 6,555,189 B2
(45) Date of Patent: *Apr. 29, 2003

(54) TWIN-LAYER THERMOPLASTIC PACKAGING AND A PROCESS FOR ITS MANUFACTURE

(75) Inventor: Jean-Louis Gueret, Paris (FR)

(73) Assignee: L'Oreal, Paris (FR)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 66 days.

This patent is subject to a terminal disclaimer.

(21) Appl. No.: 09/030,505

(22) Filed: Feb. 25, 1998

(65) Prior Publication Data

US 2002/0001685 A1 Jan. 3, 2002

Related U.S. Application Data

(63) Continuation of application No. 08/542,951, filed on Oct. 13, 1995, now Pat. No. 6,037,024.

(30) Foreign Application Priority Data

Oct. 13, 1994 (FR) .............................. 94 12234

(51) Int. Cl.[7] .............................. B32B 3/02; B32B 5/02; B32B 5/16; B32B 19/02
(52) U.S. Cl. ...................... 428/35.7; 264/108; 264/515; 425/133.1; 425/523; 425/532; 428/34.5; 428/324; 428/402; 428/407; 428/515; 428/516
(58) Field of Search .................. 428/15, 22, 34.5, 428/34.6, 34.7, 35.6, 36.4, 36.8, 147, 149, 402, 407, 515, 516, 324, 35.7; 264/515, 108; 425/133.1, 523, 532

(56) References Cited

U.S. PATENT DOCUMENTS

| 3,515,626 | A | | 6/1970 | Duffield ...................... 161/162 |
|---|---|---|---|---|
| 3,577,588 | A | | 5/1971 | Chisholm ....................... 18/12 |
| 3,879,044 | A | | 4/1975 | Estes .......................... 277/227 |
| 4,960,639 | A | | 10/1990 | Oda et al. ................... 428/34.5 |
| 5,026,594 | A | | 6/1991 | Akao .......................... 428/220 |
| 5,043,377 | A | | 8/1991 | Nogi et al. ................... 524/437 |
| 5,112,657 | A | | 5/1992 | Melber ......................... 428/15 |
| 5,213,854 | A | | 5/1993 | Williams et al. ............... 428/15 |
| 5,229,439 | A | | 7/1993 | Gueret ......................... 524/13 |
| 5,269,991 | A | | 12/1993 | Gueret ......................... 264/73 |
| 5,422,391 | A | | 6/1995 | Inoue .......................... 524/427 |
| 5,712,009 | A | * | 1/1998 | Moore et al. ................. 428/35.7 |
| 6,037,024 | A | * | 3/2000 | Gueret ........................ 428/36.8 |

FOREIGN PATENT DOCUMENTS

| BE | 676 891 | 8/1966 |
|---|---|---|
| EP | 0 204 324 | 12/1986 |
| EP | 0 438 339 | 7/1991 |
| GB | 1 096 064 | 12/1967 |
| GB | 1 408 981 | 10/1975 |

OTHER PUBLICATIONS

JP-A-04 004 147, Abstract Only, Jan. 8, 1992.
French Search Report No. FR9412234, dated Jun. 16, 1995.

* cited by examiner

*Primary Examiner*—Sandra M. Nolan
(74) *Attorney, Agent, or Firm*—Oblon, Spivak, McClelland, Maier & Neustadt, P.C.

(57) ABSTRACT

A multi-layer thermoplastic packaging, the outer layer containing at least one filler having particles of different particle size and of a diameter $\geq 50$ $\mu$m, to give a natural stone external appearance and a process for the preparation thereof which includes coextrusion and blowing of the inner and outer layers, to provide the packaging which can be in the form of a flask, bottle, pot or other desired shape.

36 Claims, No Drawings

TWIN-LAYER THERMOPLASTIC PACKAGING AND A PROCESS FOR ITS MANUFACTURE

This application is a Continuation of application Ser. No. 08/542,951, filed on Oct. 13, 1995, now U.S. Pat. No. 6,037,024.

BACKGROUND OF THE INVENTION

1. Field of the Invention

The present invention relates to a thermoplastic packaging comprising at least one inner layer and one outer layer, which is especially suited to contain cosmetic or dermatological compositions and serves to protect the contents from light radiation and from oxidation, while at the same time having a satisfying aesthetic appearance, and a process for the production of the packaging.

2. Discussion of the Background

EP-A-0 204 324 discloses a multilayer pad, the thermoplastic outer layer of which comprises an inorganic filler. However, this filler must have a very small particle size and does not provide a satisfying aesthetic appearance.

FR-A-2 657 048 teaches a process for manufacturing packaging which has a natural-stone external appearance and having a wall which consists of a monolayer thermoplastic matrix which includes at least two fillers of different sizes or particle sizes.

These types of thermoplastic packaging are obtained by means of known shaping processes of the injection-molding type.

Unfortunately, the fillers are not always distributed uniformly in the matrix and are not always present in sufficient quantity to impart a satisfying stone appearance. Indeed, too large a quantity of filler in the material leads to a reduction in the elasticity of the material and can cause the appearance of holes and/or cracks in the wall of the packaging. This leads to increased air permeability of the wall, which can lead to degradation of the contents of the packaging.

Likewise, the presence of particles of large diameter, especially greater than the thickness of the wall, may cause holes and/or cracks. However, to impart a suitable stone appearance, it is necessary to use a large quantity of filler, having a large and varied particle size.

Other techniques for shaping plastics, such as coextrusion or coextrusion/blowing are known for unfilled plastics. These techniques consist in simultaneously extruding several plastics through the same die. They can be used to obtain components whose various materials constituting the inner and outer walls do not mix and remain uniformly distributed. These techniques have the advantage of being able to use two different materials for the inner and outer walls of the packaging.

This technique is especially described in U.S. Pat. No. 4,292,355 for the manufacture of a plastic container, consisting only of a polypropylene layer and a butadiene styrene polymer layer.

Unfortunately, this choice of material does not enable fillers to be added to the materials constituting the outer layer.

SUMMARY OF THE INVENTION

Accordingly, one object of the present invention is to provide thermoplastic packaging which is hermetic with respect to air and to its contents, and is capable of providing a stone appearance.

A further object of the present invention is to provide thermoplastic packaging which can be used to contain cosmetic or dermatological compositions.

A further object of the present invention is to provide a thermoplastic multilayer packaging which is free of cracks and includes at least one inner wall and one outer wall, the outer layer of which includes at least one filler.

A further object of the present invention is to provide a process for producing the multi-layer packaging of the present invention.

These and other objects of the present invention have been satisfied by the discovery of a thermoplastic packaging comprising at least one thermoplastic inner layer and one thermoplastic outer layer, wherein the outer layer is crack-free and comprises at least one filler having particles of variable particle size and particle diameters $\geq 50$ $\mu$m, and a process for the production of the thermoplastic packaging by coextrusion/blowing.

DETAILED DESCRIPTION OF THE PREFERRED EMBODIMENTS

The present invention relates to a thermoplastic packaging comprising at least one thermoplastic inner layer and one thermoplastic outer layer, the outer layer being crack-free and comprising at least one filler containing particles of different particle size and of a diameter greater than 50 $\mu$m.

The present invention also relates to a process for manufacturing a packaging obtained by coextrusion of at least two layers, which comprises coextruding a thermoplastic inner layer and an outer layer containing particles of variable particle size and of a diameter greater than 50 $\mu$m, then blowing the outer layer so that the particles of the filler orient parallel to the inner layer and cause no cracking of the packaging.

This process can indeed be used to obtain crack-free packaging having an outer layer with particles of diameter greater than 50 $\mu$m, contrary to the process described in FR-A-2 657 048, According to the present invention, it is possible to use one or more inner layers associated with one or more outer layers, at least one of which is filled.

Preferably, the particles of the filler have a diameter ranging from 50 $\mu$m to 3 mm, more preferably ranging from 80 $\mu$m to 1.5 mm, and most preferably from 150 $\mu$m to 600 $\mu$m.

The packaging according to the present invention may use fillers having lamellar particles without fear of cracks or holes in the wall. The reason for this is that lamellar particles, once in contact with the inner layer, orient parallel to this inner layer along their length during the blowing process.

The coextruded inner layer serves for maintaining the filled material constituting the inner wall during the blowing of this filled material, thus orienting the particles appropriately.

By using the coextrusion/blowing technique, the thickness of the inner layer may represent up to approximately 80% of the total thickness of the packaging, contributing towards obtaining a satisfying stone appearance. The outer layer can have a thickness representing between 20% and 50% of the total thickness of the packaging. In order to obtain a smooth, natural-stone external appearance, the outer layer preferably has a thickness representing between 20% and 30% of the total thickness of the packaging.

In order to obtain a natural-stone external appearance with a rough surface, the outer layer preferably has a thickness representing between 30% and 50% of the total thickness of the packaging. This result may be useful for obtaining packaging with a wall in relief.

In fact, the thicker the outer layer is the more matt its color becomes, and the more rough its surface becomes, with the particles constituting the filler no longer orienting parallel to the inner wall. In such cases, the inner wall no longer plays a significant role for orienting the particles during the blowing of the filled material.

The outer layer preferably has a thickness of 0.1 mm to 0.8 mm, more preferably of 0.2 mm to 0.5 mm. The inner layer preferably has a thickness of 0.5 mm to 1.3 mm, more preferably of 0.6 mm to 1.0 mm.

The materials constituting the layers must fulfill certain criteria. They must especially be mutually compatible and allow incorporation of filler in one of them.

The inner layer is preferably made of a material compatible with the contents, so as to prevent them from degrading, and most preferably should be inert with respect to chemical compositions preferentially used in the cosmetic and dermatological fields. The material used in the inner layer is preferably a thermoplastic elastomer chosen from low-density polyethylenes, high-density polyethylenes and polypropylenes.

The material of the outer layer is preferably a material capable of protecting the contents from light radiation and from oxidation. It is most preferably a blowing-grade thermoplastic chosen from polypropylenes, polyethylenes, polyesters and polypropylene copolymers such as the products marketed under the same HIFAX™ or PROFAX™ by the HIMONT company.

The material constituting the inner layer is preferably tinted and the layer of the material constituting the outer layer is preferably opaque or translucent. When the inner layer is tinted and the outer layer is translucent, a bright vivid color is obtained for the packaging.

The filler or fillers incorporated into the material forming the outer layer are preferably chosen from mineral fillers, vegetable fillers or a mixture thereof.

Among mineral fillers, it is preferred to use calcium carbonate, calcium sulphate, zinc oxide, zinc carbonate, magnesium oxide, magnesium hydroxide, magnesium silicates such as talc, aluminum silicates such as mica, glass microballs or aluminum flakes.

Among vegetable fillers, it is preferred to use natural fibers, such as wood, cellulose or cotton fibers or particles. The particle size or diameter of the fillers preferably ranges from 50 $\mu$m to 3 mm and more preferably ranges from 80 $\mu$m to 1.5 mm.

The filler or fillers may or may not be colored. The coloring may be obtained by impregnating the particles of the filler with a colorant, such as a liquid or pulverulent colorant. The colorant is chosen so as to withstand the melting temperature of the polymer constituting the outer layer. This colorant may be fixed to the filler and/or coated with a thermosetting resin, such as urea/formaldehyde copolymer, or with a polymer of the acrylic or vinyl type, obtained by in situ polymerization on the filler, or else fixed according to the process described in FR-A-4 651 789.

Introducing a colored filler into a translucent or white material constituting the outer layer does not modify the color of the material. This also applies for a colored material and a colorless filler.

By the appropriate and combined choice on the one hand, of the color, the amount and the particle size of the filler, and on the other hand, of the color of the material forming the outer layer, it is possible to obtain, in a reproducible manner, a uniform distribution of the filler in the material and to give it a natural-stone external appearance.

The outer layer of the packaging according to the invention may be obtained by preparing a mixture of various fillers, just as they are cr in a preblend form, and then by incorporating these fillers into the material forming the outer layer.

The material constituting the inner layer and that of the filled outer layer are coextruded and then blown, the inner layer subsequently pushing the fillers of the outer layer and orienting them parallel to the wall of the packaging.

The packaging of the present invention may be in any desired shape, preferably in the form of a flask, pot or bottle, with a flask having a natural stone appearance being most preferred.

The invention also relates to a process for manufacturing a thermoplastic packaging obtained by coextrusion of at least two layers, comprising coextruding a thermoplastic inner layer and an outer layer containing at least one filler containing particles of variable particle size of a diameter greater than 50 $\mu$m, and blowing the two layers so that particles of the filler in the outer layer orient parallel to the inner layer.

Having generally described this invention, a further understanding can be obtained by reference to certain specific examples which are provided herein for purposes of illustration only and are not intended to be limiting unless otherwise specified.

EXAMPLES

Examples of packaging in accordance with the present invention are provided below.

Example 1

The following filler was prepared:
1)—Granules of white polypropylene, of blowing grade, for the inner layer 10 parts
2)—Granules of polypropylene of beige color, containing 5% of mica particles coated with an orange colorant, particle size 200 $\mu$m, for the inner layer 1 part The granules 1) and 2) were coextruded at approximately 200° C. in a crosshead extruder having several charging screws, in order to obtain a twin-layer parison, the distribution in which was 70% of granules 1) and 30% of granules 2). After inserting the parison into a mold hot, the parison was blown in order to form a twin layer packaging, in the shape of the mold, and to orient the fillers of the outer layer parallel to the inner layer. This blowing was possible because of the presence of the inner layer which prevents the formation of cracks in the filled outer layer during blowing.

The packaging was obtained by means of an extrusion/blowing machine of the MAGIC, BEKUM or KAUTEX brand equipped with a twin-layer extrusion head of the same brand and with several charging screws.

The inner layer had a thickness of 0.9 mm and the outer layer a thickness of 0.5 mm.

The packaging obtained had the shape of a flask with a stone appearance, the color of which had a beige-colored background, mottled or flecked with small orange specks resembling ashlar. The inner layer of the packaging was white.

This flask enables any product used in cosmetics and/or dermatology to be packaged.

Example 2

The following filler was prepared:

1) Granules of beige-brown polypropylene, of blowing grade, for the inner layer 4 parts
2) —Granules of polypropylene, of blowing grade, filled with 15% of beige-colored wood fibers of 160 $\mu$m particle size and with 15% of white, rust-colored and light pink-colored mica (30:50:20) with variable particle sizes lying between 280 $\mu$m and 1400 $\mu$m 10 parts
 —Granules of ochre-colored polypropylene containing 40% of long wood fibers, more darkly ochre-tinted, for the outer layer 1 part For the coextrusion and blowing, the procedure was as in Example 1 and, after blowing, a flask was obtained having a stone appearance, the color of which had a beige colored background flecked with small specks of ochre color. The parison obtained by coextrusion included 50% of granules 1) and 50% of granules 2). The total wall of the flask had a thickness of 1.5 mm, with inner and outer layers each being approximately 0.75 mm in thickness.

The flask was beige on the inside and had the appearance of brown granite on the outside, the inner tint reinforcing the outer tint because the outer wall was translucent.

This flask enables any product used in cosmetics and/or dermatology to be packaged.

Obviously, numerous modifications and variations of the present invention are possible in light of the above teachings. It is therefore to be understood that within the scope of the appended claims, the invention may be practiced otherwise than as specifically described herein.

What is claimed as new and desired to be secured by Letters Patent of the United States is:

1. A thermoplastic blow molded, co-extruded packaging comprising:
   a product contained in said packaging, said product comprising at least one of a cosmetic composition and a dermatological composition;
   a thermoplastic inner layer in contact with said product, wherein said inner layer is formed of a material compatible with said product; and
   a thermoplastic outer layer;
   wherein the outer layer is crack-free and comprises filler particles, said filler particles comprising particles having an average diameter greater than 50 $\mu$m, and selected from the group consisting of lamellar particles, fibrous particles, and a mixture thereof.
2. The packaging according to claim 1, wherein the filler particles have particle diameters ranging from 50 $\mu$m to 3 mm.
3. The packaging according to claim 1, wherein the filler particles have particle diameters ranging from 80 $\mu$m to 1.5 mm.
4. The packaging according to claim 1, wherein the outer layer further comprises a material capable of providing protection from light radiation and from oxidation, and imparting an aesthetic appearance to packaging contents.
5. The packaging according to claim 1, wherein the inner layer comprises a material inert with respect to a chemical cosmetic composition contained within the packaging.
6. The packaging according to claim 1, wherein the inner layer is made of a thermoplastic elastomer selected from the group consisting of low-density polyethylenes, high-density polyethylenes and polypropylenes.
7. The packaging according to claim 1, wherein the outer layer comprises a thermoplastic material selected from the group consisting of polypropylenes, polyethylenes, polyesters and polypropylene copolymers.
8. The packaging according to claim 1, wherein the inner layer has a thickness ranging from 0.5 mm to 1.3 mm.
9. The packaging according to claim 1, wherein the outer layer has a thickness ranging from 0.1 mm to 0.8 mm.
10. The packaging according to claim 1, wherein the filler is a member selected from the group consisting of mineral fillers, vegetable fillers and mixtures thereof.
11. The packaging according to claim 10, wherein the mineral filler is a member selected from the group consisting of calcium carbonate, calcium sulphate, zinc oxide, zinc carbonate, magnesium oxide, magnesium hydroxide, magnesium silicates, aluminum silicates, glass balls, and aluminum flakes.
12. The packaging according to claim 10, wherein the vegetable filler is a member selected from the group consisting of wood fibers, cotton fibers and cork particles.
13. A flask having a natural-stone appearance, wherein the flask is prepared from a thermoplastic packaging according to claim 1.
14. A process for manufacturing a thermoplastic packaging comprising coextruding at least one thermoplastic inner layer and an outer layer containing at least one filler having particles of variable particle size and particle diameters $\geq 50$ $\mu$m, and blow-molding the inner and outer layers to orient the particles of the filler in the outer layer parallel to the inner layer, and wherein the outer layer is crack free.
15. A thermoplastic blow molded, co-extruded container comprising:
    a product contained in said container, said product comprising at least one of a cosmetic composition and a dermatological composition;
    a thermoplastic inner layer in contact with said product, wherein said inner layer is formed of a material compatible with said product; and
    a thermoplastic outer layer;
    wherein the outer layer is crack-free and comprises filler particles, said filler particles comprising particles having an average diameter ranging from 150 $\mu$m to 600 $\mu$m.
16. The packaging according to claim 1, wherein said outer layer is adjacent to and in contact with said inner layer.
17. The packaging according to claim 1, wherein filler particles of said outer layer are oriented parallel to a surface of the inner layer.
18. The packaging according to claim 1, wherein said outer layer is adjacent to and in contact with said inner layer, and further wherein, during blow molding of said packaging filler particles of said outer layer contact said inner layer and become oriented parallel to a surface of said inner layer.
19. The packaging according to claim 1, wherein the material of the inner layer is tinted and said outer layer comprises a translucent material.
20. The packaging according to claim 1, wherein said outer layer comprises a material which is one of white and translucent.
21. The packaging according to claim 20, wherein said filler particles include colored filler particles.
22. The packaging according to claim 1, wherein said outer layer comprises a colored material and said filler particles include colorless filler particles.
23. The packaging according to claim 1, wherein said packaging has an ashlar appearance.
24. The packaging according to claim 1, wherein said packaging has an appearance of brown granite.
25. The packaging according to claim 1, wherein said particles have a diameter smaller than a thickness of the outer layer.

26. The process according to claim 14, further including selecting a material for said inner layer which is compatible with a product, wherein said product comprises one of a cosmetic composition and a dermatological composition, the process further including, after blow molding the inner and outer layers, filling said packaging with said product such that said product is in contact with said inner layer.

27. The packaging according to claim 15, wherein said outer layer is adjacent to and in contact with said inner layer.

28. The packaging according to claim 15, wherein filler particles of said outer layer are oriented parallel to a surface of the inner layer.

29. The packaging according to claim 15, wherein said outer layer is adjacent to and in contact with said inner layer, and further wherein, during blow molding of said packaging filler particles of said outer layer contact said inner layer and become oriented parallel to a surface of said inner layer.

30. The packaging according to claim 15, wherein the material of the inner layer is tinted and said outer layer comprises a translucent material.

31. The packaging according to claim 15, wherein said outer layer comprises a material which is one of white and translucent.

32. The packaging according to claim 31, wherein said filler particles include colored filler particles.

33. The packaging according to claim 15, wherein said outer layer comprises a colored material and said filler particles include colorless filler particles.

34. The packaging according to claim 15, wherein said packaging has an ashlar appearance.

35. The packaging according to claim 15, wherein said packaging has an appearance of brown granite.

36. The packaging according to claim 15, wherein said particles have a diameter smaller than a thickness of the outer layer.

* * * * *